Dec. 27, 1938.   LE ROY V. ALLEN   2,141,781
DEVICE FOR INCREASING AND DECREASING ROAD CLEARANCE
OF VEHICLES AND AN ADJUSTABLE ANCHOR
Filed Feb. 17, 1937   2 Sheets-Sheet 1
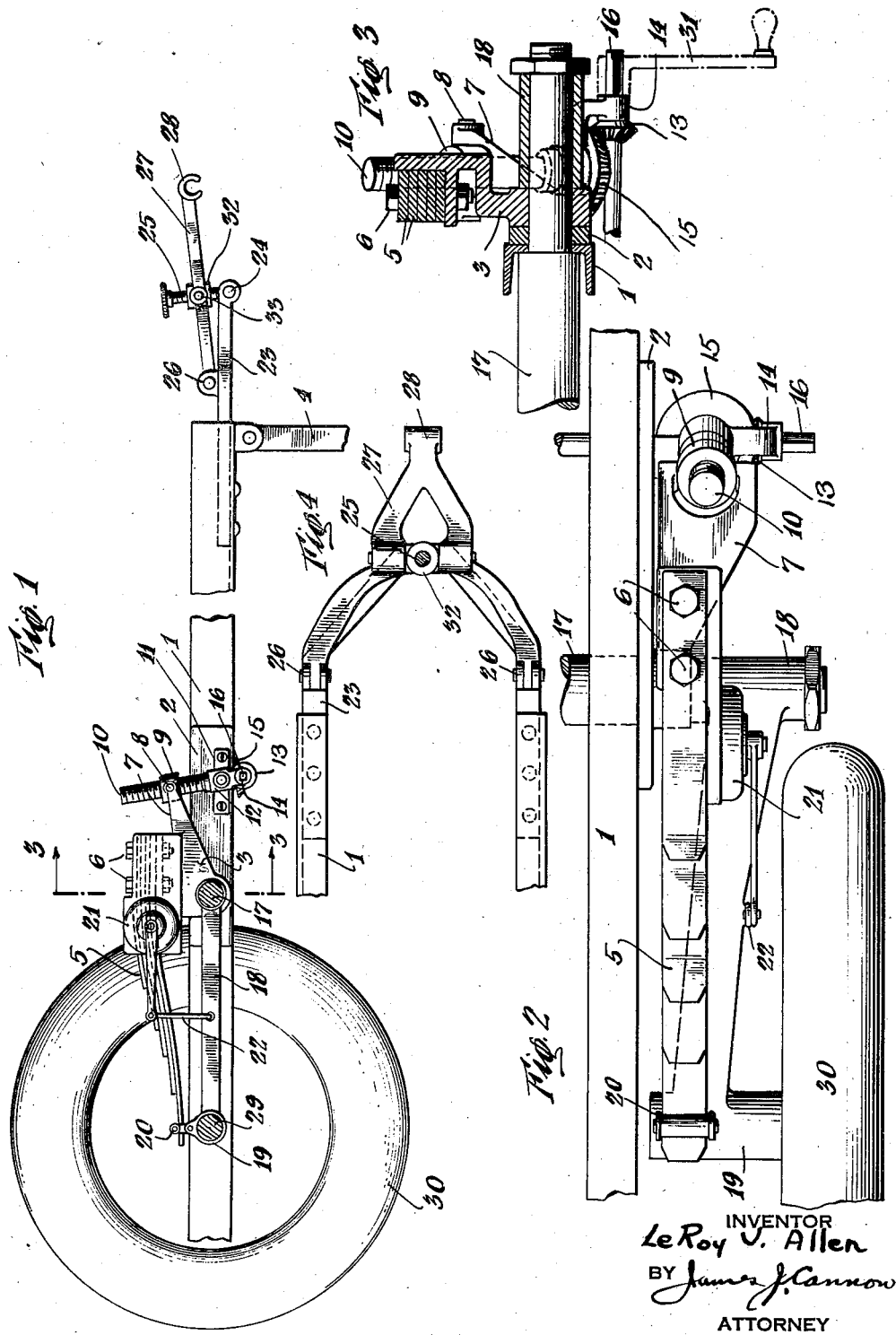
INVENTOR
Le Roy V. Allen
BY James J. Cannon
ATTORNEY

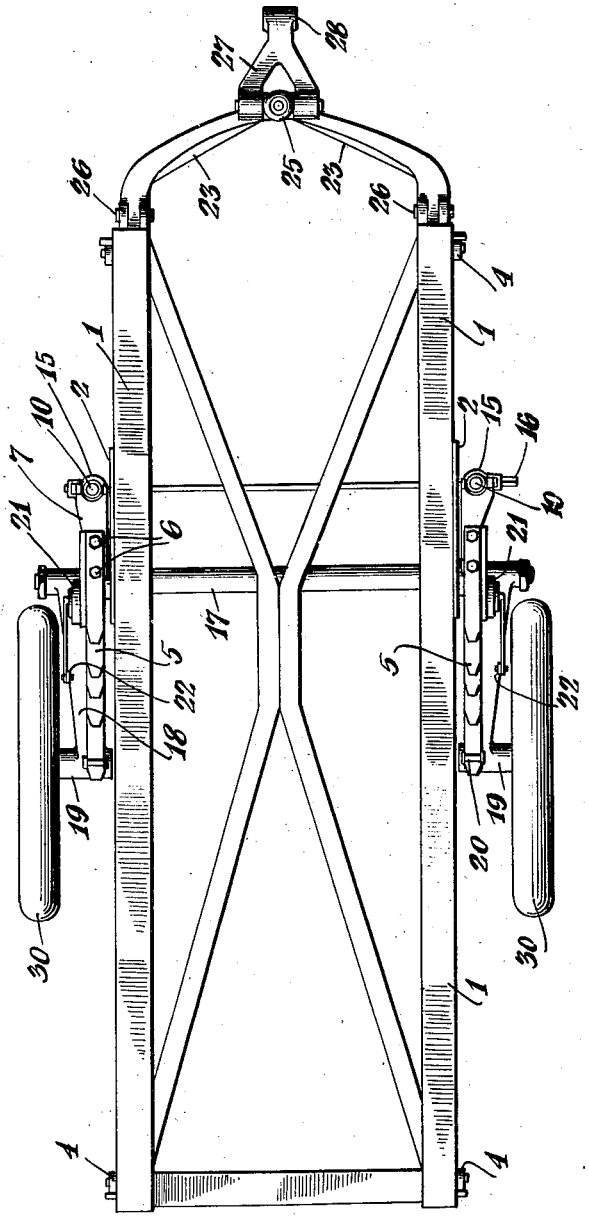
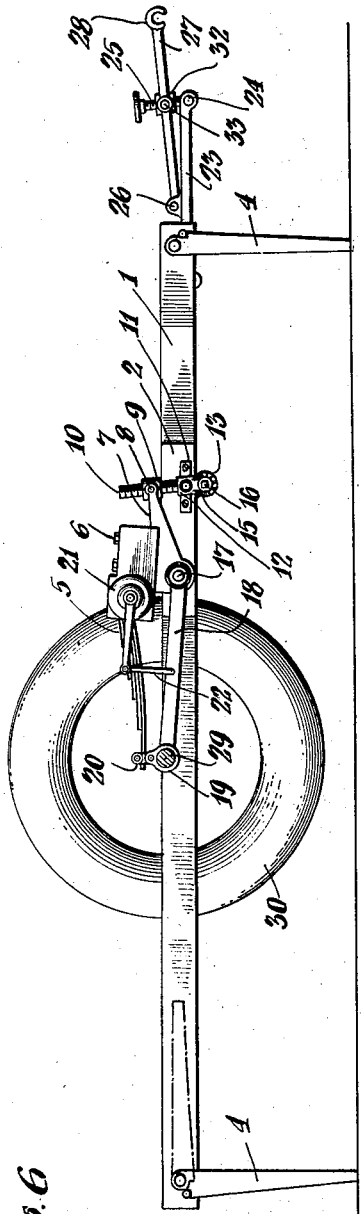

Patented Dec. 27, 1938

2,141,781

UNITED STATES PATENT OFFICE 2,141,781

DEVICE FOR INCREASING AND DECREASING ROAD CLEARANCE OF VEHICLES AND AN ADJUSTABLE ANCHOR

Le Roy V. Allen, Hohokus, N. J.

Application February 17, 1937, Serial No. 126,159

4 Claims. (Cl. 280—6)

My invention relates to improvements in a new and useful device for increasing and decreasing road clearance of vehicles and an adjustable anchor. The objects of my invention are first, to provide a means to increase the road clearance to any necessary height within reason to enable a vehicle to travel over roads with deep ruts, boulders, bumps, crests, i. e. such as are commonly known as back roads, roads around lakes, mountain roads, rural roads and the like. Secondly, to lower the center of gravity of a vehicle for safe travel on a good highway which will permit and warrant traveling at a high rate of speed such as the new concrete roads where one can travel in the open country for many miles without any traffic interference. Thirdly, my device affords an opportunity to store a vehicle in an average garage, i. e. where the clearance is at a minimum and one could not store the average vehicle. Fourthly, my device facilitates the changing of tires by the provision of means for supporting the vehicle's frame a predetermined distance off the ground.

One form of my invention is illustrated in the accompanying drawings in which Figure 1 is a side elevation. Figure 2 is a fragmentary top plan view enlarged. Figure 3 is a sectional view of Figure 1 on line 3—3. Figure 4 is a top plan view of the adjustable anchor device. Figure 5 is a top plan view of the vehicle according to the invention, and Figure 6 is a side elevation showing the vehicle frame supported on the ground and with the wheel raised above the same in position for exchanging the tire.

As illustrated, my device comprises a re-inforcing plate 2 for the chassis 1 of the trailer, which carries a bracket 3, pivotally secured thereto at one end by means of the pivot pin 17, and the other end of the bracket carries a collar 9 pivoted to the bracket, as at 8. Through the collar extends an adjusting screw bolt 10, the lower end of which is mounted in a sleeve 12 formed with a bracket 11 secured to plate 2, and extending through the sleeve 12.

At its lower end the screw bolt 10 carries a bevel gear 13 in mesh with a bevel gear 15 on a shaft 16, extending across the chassis and connected to a similar mechanism as aforedescribed on the opposite side of the chassis. To shaft 16 is attached a crank handle 31, and a hanger 14 is provided for supporting the shaft 16. To the pivot pin 17 of the bracket 3 is attached one end of a supporting arm 18 for the wheel axle 29, in its supporting sleeve 19 carrying the shackle 20 confining the end of the laminated spring 5 the other end of said laminated spring being mounted on bracket 3 by means of bolts 6. Intermediate the ends of the arm 18 is attached thereto one arm 22 of a bell-crank lever, the other arm of which is attached to the shock absorber 21.

When the device is to be used for anchoring the trailer to a car, the chassis of the trailer is equipped with an extension 23 to which is fulcrumed, as at 26, a lever 27, the other end of which carries a coupling member 28 adapted to engage a suitable coupling member of the car, and adjustment of the anchorage level between car and trailer is effected by means of the adjusting screw 25 passed through a suitable socket on lever 27 intermediate the ends thereof and engaging the outer end of the fulcrumed portion of extension 23 through which the pin 24 for the two coupling members is passed.

Suitable legs 4 are pivotally attached at the four corners of the chassis of the trailer and are normally held elevated in frictional engagement with the sides of the chassis frame while in their lowered position they engage the ground and their turning about the pivot points is limited by means of suitable means, such as for instance pins protruding from the chassis and engaging suitable recesses in the legs. In their lowered position these legs 4 support the trailer during coupling and uncoupling of the same and when the wheels are lifted from the ground by an operation of the crank handle in the opposite direction to permit a ready exchange of the tires.

By turning crank-handle 31, motion is transmitted to gears 13 and 15 and to adjusting screw 10 and to bracket 3, which transmits the motion to arm 18, spring 5, axle 29 and wheel 30.

The said movement is available either to raise or lower the center of gravity. It raises the center of gravity to permit a vehicle to go over a very bad road and lowers it for use on good roads or to put the vehicle in a garage with only a normal clearance.

In order to keep the vehicle at an even keel if for instance the coupling member 28 is to be coupled with a suitable coupling member on a car one must operate the adjustable anchor in harmony with my said device for increasing or decreasing the clearance of vehicles by turning chassis adjustable screw 25, which in turn transmits motion to lever 27 and in turn to chassis extension 23 to which lever 27 carrying the coupling member 28 is pivotally attached and chassis 1. Collar 32 and pivot 33 form part of the adjusting means previously described.

My device is of simple construction and may be made with only one adjusting means attached to chassis 1 at bracket 3, however in some cases two adjusting means may be desirable, pivot shaft 17 extends to the other side of chassis, where it joins with bracket 3, spring 5, supporting arm 18, axle 29 and wheel 30 located at the other side of the frame. A shock absorber 21, may be used in conjunction with my device.

My device is made principally of iron and steel and may be cast, welded, machined or by other means.

My device is well adaptable to trailers. Trailers in their present form are made either with a high center of gravity or a low center of gravity. If made with a low center of gravity they cannot be used on roads with ruts, such as lake roads, etc. If made with a high center of gravity they cannot be stored in the average garage which is attached to a private home, which garage has only a medium height. Furthermore, if it has a high center of gravity it is not as easy to operate at high speeds while traveling on good roads.

Four swinging legs are attached to the chassis, one for each corner of the said chassis, to facilitate the changing of tires and for supporting the vehicle for any other purpose. Thus, if a puncture should occur, the tire may quickly and readily be changed by either raising or lowering the center of gravity of the vehicle depending upon its present position with respect to the legs 4. These legs 4 are normally held frictionally against the vehicle frame but may be swung about on pivot points to engage the ground and thereby offer a support for the frame. In this position, the adjusting mechanism may be used to raise the wheel and tire off the ground.

My device may be applied to other forms of motor, or other vehicles, and I do not intend to confine its use to trailers.

While I have illustrated my invention in one form only and as made of specific materials, I do not intend to limit myself to that particular design, method, size, shape or materials, as it is apparent that other designs, methods, size, shape or materials may be employed within the scope of the claims for obtaining the same results without departing from the scope of my invention.

I claim:

1. The combination with a vehicle frame; of an axle, an arm pivoted at one end to said frame, the other end supporting said axle, resilient means supporting said lever at a predetermined angle with said frame, and means in said frame for enabling manual adjustment of said resilient means to vary the angle between said lever and said frame, whereby said frame may be raised or lowered with respect to the wheels, and means on said frame for supporting the same at a predetermined distance off the ground, whereby the wheels may be raised off the ground to facilitate the changing of tires.

2. The combination with a trailer frame having means for attaching the same to a motor vehicle, of a wheel supporting axle, an arm pivoted at one end to said trailer frame and the other end carrying said wheel-supporting axle, resilient means supporting said arm at a predetermined angle with said trailer frame, said means being connected to the wheel-supporting end of said arm and pivoted to the pivot pin of said arm at the frame and means on said frame for enabling manual adjustment of said arm and said resilient means to vary the angle between said arm and said frame, whereby said frame may be raised or lowered with respect to the wheels, and means for enabling manual adjustment of said attaching means to level off said trailer frame to correspond to the position of the wheels with respect to said frame.

3. The combination with a vehicle frame; of a wheel axle, an arm having one end pivoted to said frame supporting said wheel axle, a bracket having one end pivotally secured to the pivot pin of said arm and having a screwthreaded socket at the free end thereof, a spring interconnecting the free ends of said arm and said bracket, a screwbolt mounted on said frame and engaging said screwthreaded socket, whereby said vehicle frame may be raised or lowered with respect to said wheels to regulate the center of gravity.

4. The combination with a vehicle frame; of an axle for supporting a pair of wheels at opposite sides of said frame, an arm pivoted at one end to said frame, the other end supporting the wheel, a bracket having one end pivotally secured to the pivot pin of said arm and provided with a screwthreaded socket, a spring interconnecting the free ends of said arm and said bracket, a screwbolt mounted for operation on said frame and engaging said screwthreaded socket, a transverse shaft rotatably mounted on said frame, spur-gears interconnecting said shaft and said screwbolt, whereby the wheels on opposite sides may be raised or lowered simultaneously with respect to said frame by the operation of said screwbolt.

LE ROY V. ALLEN.